US007475812B1

(12) United States Patent
Novozhenets et al.

(10) Patent No.: US 7,475,812 B1
(45) Date of Patent: Jan. 13, 2009

(54) SECURITY SYSTEM FOR ACCESS CONTROL USING SMART CARDS

(75) Inventors: Yuri Novozhenets, Rochester, NY (US); Michael Regelski, Spencerport, NY (US)

(73) Assignee: Lenel Systems International, Inc., Pittsford, NY (US)

( * ) Notice: Subject to any disclaimer, the term of this patent is extended or adjusted under 35 U.S.C. 154(b) by 410 days.

(21) Appl. No.: 11/298,885

(22) Filed: Dec. 9, 2005

(51) Int. Cl.
*G06K 5/00* (2006.01)

(52) U.S. Cl. ....................................... 235/382; 235/380

(58) Field of Classification Search ................. 235/380, 235/382, 492; 707/9, 10
See application file for complete search history.

(56) References Cited

U.S. PATENT DOCUMENTS

| | | | | |
|---|---|---|---|---|
| 4,218,690 | A | 8/1980 | Ulch et al. | |
| 4,544,832 | A | 10/1985 | Young et al. | |
| 4,816,658 | A | 3/1989 | Khandwala et al. | |
| 4,839,640 | A | 6/1989 | Ozer et al. | |
| 5,163,097 | A * | 11/1992 | Pegg | 713/183 |
| 5,629,981 | A * | 5/1997 | Nerlikar | 713/168 |
| 6,233,588 | B1 | 5/2001 | Marchoili et al. | |
| 6,317,834 | B1 * | 11/2001 | Gennaro et al. | 713/186 |
| 6,536,665 | B1 * | 3/2003 | Ray et al. | 235/380 |
| 6,738,772 | B2 | 5/2004 | Regelski et al. | |
| 6,839,840 | B1 | 1/2005 | Cooreman | |
| 7,111,321 | B1 * | 9/2006 | Watts et al. | 726/2 |
| 7,137,553 | B2 * | 11/2006 | Register et al. | 235/382.5 |
| 7,159,778 | B1 * | 1/2007 | Kochevar et al. | 235/462.01 |
| 7,303,120 | B2 * | 12/2007 | Beenau et al. | 235/380 |
| 2003/0212894 | A1 | 11/2003 | Buck et al. | |

OTHER PUBLICATIONS

Personal Identity Verification (PIV) of Federal Employees and Contractors, Federal Information Processing Standards Publication 201-1, U.S. Department of Commerce, Mar. 2006, pp. i-x and 1-81.
Short Form Specification, mifare DESFire, Contactless Multi-Application IC with DES and 3DES Security MF3 IC D40, Philips Semiconductors, Apr. 2004, pp. 1-12.
Technical Implementation Guidance: Smart Card Enabled Physical Access Control Systems, PACS Implementation Guidance, Version 2.2, Jul. 2004, pp. 1-32.
Government Smart Card Interoperability Specification, Version 2.1, National Institute of Standards and Technology Ineragency Report 6887-2003 Edition, Jul. 2003.

* cited by examiner

*Primary Examiner*—Ahshik Kim
(74) *Attorney, Agent, or Firm*—Kenneth J. Lukacher

(57) ABSTRACT

An improved security system for access control using smart card badges and readers, and one or more access controllers coupled to the readers. Each access controller has a database storing for each badge at least a Credential Identifier and an encrypted Authorization Code as badge number and issue code, respectively, and access privileges data for the cardholder. Each badge has memory storing a Credential Identifier and unique Smart Card Serial Number. The Authorization Code is encrypted using a badge's Credential Identifier and unique Smart Card Serial Number using a Site Secret Key. Each reader can read a badge's Credential Identifier and Smart Card Serial Number and generate an encrypted Authorization Code using the read Credential Identifier and Smart Card Serial Number, and the Site Secret Key. The access controller receives from the reader a request having at least the read Credential Identifier and generated Authorization Code as a badge number and issue code, respectively, and uses such in determining whether the cardholder has access at the reader.

17 Claims, 4 Drawing Sheets

SECURITY SYSTEM FOR ACCESS CONTROL USING SMART CARDS

FIELD OF THE INVENTION

The present invention relates to a security system (and method) using smart card badges for controlling access to areas of facilities, and particular to a security system using smart cards as badges having improved authentication of cardholders at readers in the system. The invention is especially useful as smart cards and improved authentication of the present invention can be readily adapted into existing infrastructures of access control systems by modifying of hardware and software at readers and at workstations for enrolling badges to personnel, thereby avoiding the need for new hardware/software at the central or distributed access controllers which makes access decisions in the system.

BACKGROUND OF THE INVENTION

Security systems for access control in facilities typically use a central access controller or multiple distributed access controllers, which are coupled to readers associated with locking mechanisms at doors. Security systems with a central access controller are described for example in U.S. Pat. Nos. 4,839,640, 4,816,658, 4,544,832, and 4,218,690. A security system with a distributed access controllers is described in U.S. Pat. No. 6,738,772. Personnel are provided badges or cards encoded with badge information that can be read by a reader, and then passed by the reader to an access controller, which makes an access decision according with the badge information and any additional authentication data (e.g., pin number and/or biometric(s)) received.

Badge information is encoded on badges magnetically (e.g., magnetic strip), optically (e.g., bar code), or wirelessly (e.g., RF tag), in a manner such that readers can access such information from the badges when presented to readers. Traditionally, the information encoded represents at least a badge number and an issue code. The badge number is a unique number or code assigned to the owner of the badge, while the issue code identifies each reissue of the badge. For example, when a badge is first issued to a person the issue code may be set to one. If the badge is later reissued to the person, which often occurs as badges can be damaged or lost, the issue code is set to two or other number indicating it is a different badge from the one damaged or lost. This avoids unauthorized use of the old badge.

One problem is that badges can be forged enabling unauthorized access by copying badge information from an existing badge onto a new badge. Such forging is possible by the use of similar technology to that used in creating badges in the system. Unauthorized access can risk both personnel and protected property of a company, university or other establishment relying on its security system. Moreover, even a user reporting a lost badge does not protect against the sophisticated forger who can modify the stored badge information on the lost badge with a new reissue code, thereby forging a new badge. This problem is often exacerbated by the absence of additional authentication, such as provided by pin number entry and/or biometrics capture, at the reader, which could assist in avoiding unauthorized access by a forged badge.

Thus, an improved security system is desirable which reduces the risk of unauthorized access using a forged badge, and adds improved authentication of badges, even at a reader which lacks additional authentication by use of a pin number entry and/or biometrics. It is further desirable that such improved security system can be readily implemented in an existing security system infrastructure (hardware and software) without requiring the expense of new or retrofitted access controller(s), or purchase of a new access control security system.

SUMMARY OF THE INVENTION

It is an object of the present invention to provide an improved access control security system using smart cards as badges, and enhanced authentication of such badges at readers.

It is another object of the present invention to provide an improved access control security system which can readily be adapted to an existing security system by use of readers capable of reading smart cards, and data encryption without requiring modification of access controller(s) or their databases used to stored information for making access decisions.

Briefly described, the present invention is based on an access control security system having at least one access controller with a database storing at least badge numbers and associated issue codes and access privileges data, and one or more readers associated with the access controller. The system uses smart cards as badges (referred to as smart card badges), which each have a unique Smart Card Serial Number stored in their memory. When enrolled in the system a Credential Identifier is stored (or encoded) on the smart card badge, and an Authentication Code (or HMAC) is generated by encrypting the Smart Card Serial Number and Credential Identifier using as a seed a Site Secret Key. The Credential Identifier along with the encrypted Authentication Code is then stored in the database of the access controller as the badge number and issue code, along with access privileges data. Each reader has memory storing the Site Secret Key, and when presented with a smart card badge, reads the badge's Smart Card Serial Number and Credential Identifier, generates an Authentication Code by encrypting the Smart Card Serial Number and Credential Identifier using as a seed the Site Secret Key, sends a request to the access controller with a badge number and issue code set as the read Credential Identifier and generated Authentication Code, respectively. The access controller makes an access control decision based on its database in response to the received badge number and issue code of the request matching that stored in its database, and access privileges data associated with the badge number, and then sends a response to the reader with an access decision.

If one or more readers are capable of obtaining additional authentication data, such as pin number (e.g., via a keypad on the reader) and/or biometrics (e.g., reader imager or scanner capable of face, fingerprint, or retina, or reader audio circuitry for voice data capture), such authentication data entered or captured by the reader is also sent in the request to the access controller. After authentication of the badge number and issue code (i.e., Credential Identifier and encrypted Authentication Code) is of a valid cardholder in its database, the access controller may further compare authentication data from the request with previously stored data in its database in determining the access decision.

The present invention further embodies a method for access control in a system using smart card badges having at least one access controller and one or more readers coupled to the access controller. The method has the steps of: storing in a database of the access controller for each of the smart card badges at least a Credential Identifier and an encrypted Authorization Code as badge number and issue code, respectively, and access privilege data for the smart card badge; presenting one of the smart card badges to a reader; reading at the reader the Credential Identifier and Smart Card Serial Number from the smart card badge; generating at the reader an encrypted Authorization Code based on the read Credential Identifier and Smart Card Serial Number, and a Site Secret Key; sending a request to the access controller with the read Credential Identifier and generated Authorization Code; receiving at the access controller the request in which the access controller construes the Credential Identifier and the Authorization Code as a badge number and issue code, respectively; and comparing at the access controller the badge number and issue code with the badge number and issue code for the smart card badges stored in the database of the access controller; and granting access at the reader when the badge number and issue code matches that store in the database of the access controller and the smart card badge has access privileges at the reader sending the request.

A badging workstation may also be provided for a security system using smart card badges having a computer system with memory storing at least a Site Secret Key, and a smart card reader/writer coupled to the computer system for reading a Smart Card Serial Number from a smart card badge. The computer system determines a unique Credential Identifier for the smart card badge, generates an encrypted Authorization Code based on the Credential Identifier and Smart Card Serial Number, and the Site Secret Key, and provides to another computer system (e.g., computer server) the Credential Identifier and encrypted Authorization Code as the badge number and issue code for download to one or more access controller.

BRIEF DESCRIPTION OF THE DRAWINGS

The foregoing objects, features and advantages of the invention will become more apparent from a reading of the following description in connection with the accompanying drawings in which.

DETAILED DESCRIPTION OF THE INVENTION

Figure 1:
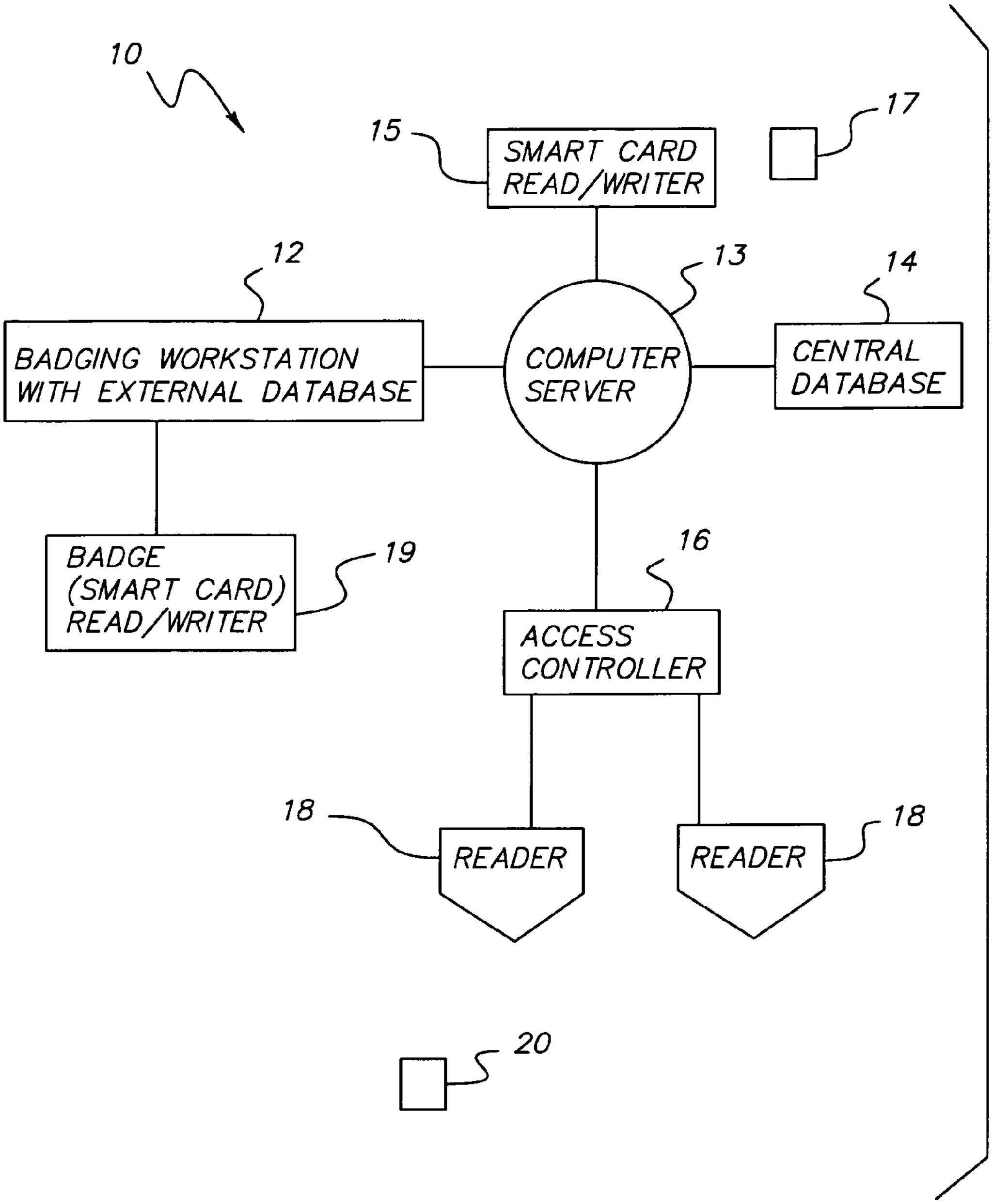
FIG. 1 is a block diagram of the system in accordance with the present invention.

The present invention is an improvement of the security system and method for access control described in U.S. Pat. No. 6,738,772, which is herein incorporated by reference. FIG. 1 shows a general block diagram of the system of this patent, which has been simplified for purposes of illustrating the invention. A system 10 has a computer server 13 and a central database 14. Computer server 13 represents a programmed computer system which can read and write (store) information to the central database 14. Central database 14 represents memory for storing all information for system 10. Central database 14 may be part of the computer server 13, such as a hard (or optical) disk drive, or a separate memory storage unit coupled to the computer server.

A badging workstation 12 is provided representing a computer system with a memory storage unit (such as a hard or optical disk drive) providing a database. This database is referred to herein as an external database as it represents a different database from the central database, and to use terminology set forth in the above-incorporated patent. The external database stores at least employee information, and badge information at least to the extent of the Badge Number and Issue Code associated with badges used by employees, contractors, or other persons, to access areas of one or more buildings or sites controlled by the system. Employee information represents demographic information relevant to all employees, contractors, or any person who may be issued a badge, such as name, site, status, department, phone, employee ID, employee picture, and the like. Badging information may additionally include pin number which may be needed by one or more readers having keypads for enter of a pin number. Badging information may further include biometric data which may be needed by one or more readers having means for capture of biometric characteristics, such as voice, fingerprint, face, retina, or other type, of recognition of an individual. Peripheral devices may be coupled to the badging workstation for capturing biometric information, such as digital imagers (e.g., cameras) or scanners to input fingerprint, face, or retina of the person, or audio circuitry for input of a voice password. The badging workstation can process such input into data useful for biometric authentication of a person, as typical of software for biometric identification/recognition.

For example, the badging workstation 12 may be located in the human resource department of a company, university, or other institution for maintaining personnel records and management of badges. The badging workstation provides for assigning or changing badges for employees in the system. Although the term employee is used herein it generally refers to any person in the organization regardless as to whether the organization is a company, university, hospital, or other institution. Additions or changes in the external database of badging workstation 12 are provided in transaction data, which are download by computer server 13 into central database 14 by mapping the transaction data received from the external database of badging workstation 12 into records of one or more tables of the central database 14, as described in the above incorporated patent.

The system has multiple access controllers which are each coupled to readers 18. For purposes of illustration, one such access controller 16 is illustrated in FIG. 1 with two readers 18. Each access controller 16 can support one to N readers. For example, N may equal sixty-four. Each reader 18 may be associated with a locking mechanism to a door which controls entry to or exit from an area of a building. A database in memory at each access controller 16 stores multiple records, where each record has a Badge Number, Issue Code, and access privileges data and any other associated information for the badge, such as pin number or biometric data, that may be needed for authentication by one or more readers. Each access controller 16 makes access decisions responsive to access request received from its associated readers 18 in accordance with the records of the database of the access controller.

When the information downloaded into the central database 14 affects access to areas, the computer server 13 automatically distributes security information from the central database to the access controllers. The security information represents badge data and access privilege data for storage in the database of the access controller, and is used by the access controller in making decisions in response to requests from readers 18. Since the mapping of transaction data to the central database, tables, and downloading of security information is described in the above-incorporated patent, a detailed discussion of such is not provided.

Improved authentication in system 10 is provided by the use of smart cards as badges 20 (referred to hereinafter as smart card badges) and readers 18 for reading such smart cards, and data encryption utilizing a Site Secret Key. Each reader represents a microprocessor or micro-controller based device operating in accordance with a program stored in memory of the reader, and has mechanical, optical, magnetic, or RF interface for reading smart cards, in which the smart card memory is read via such interface when received or in proximity to the reader. As stated earlier, one or more of the readers 18 may also have keypads for entry of pin numbers associated with the badges, and/or imagers or scanners for input of biometric information, if needed.

Smart cards may represent an electronic card or unit having memory which can be read by reader 18. For example, the smart cards may be DESFire Smart Cards manufactured by Phillips Semiconductor, Inc. Such smart cards may have a controller for controlling interface (wired or wireless) and management of memory of the card, but may be passive memory cards. Each smart card when manufactured has a unique Smart Card Serial Number stored in its memory or embedded in the card, which cannot be easily forged or duplicated. The particular electronics and data structure of the smart cards, and the electronics and software (e.g., commands, data, or addressing) used by readers to access such memory depends on the type of smart cards being used as badges. Each smart card may have other information stored, but at a minimum has a Smart Card Serial Number or other code unique to each different smart card for identification of the cards.

Figure 2:
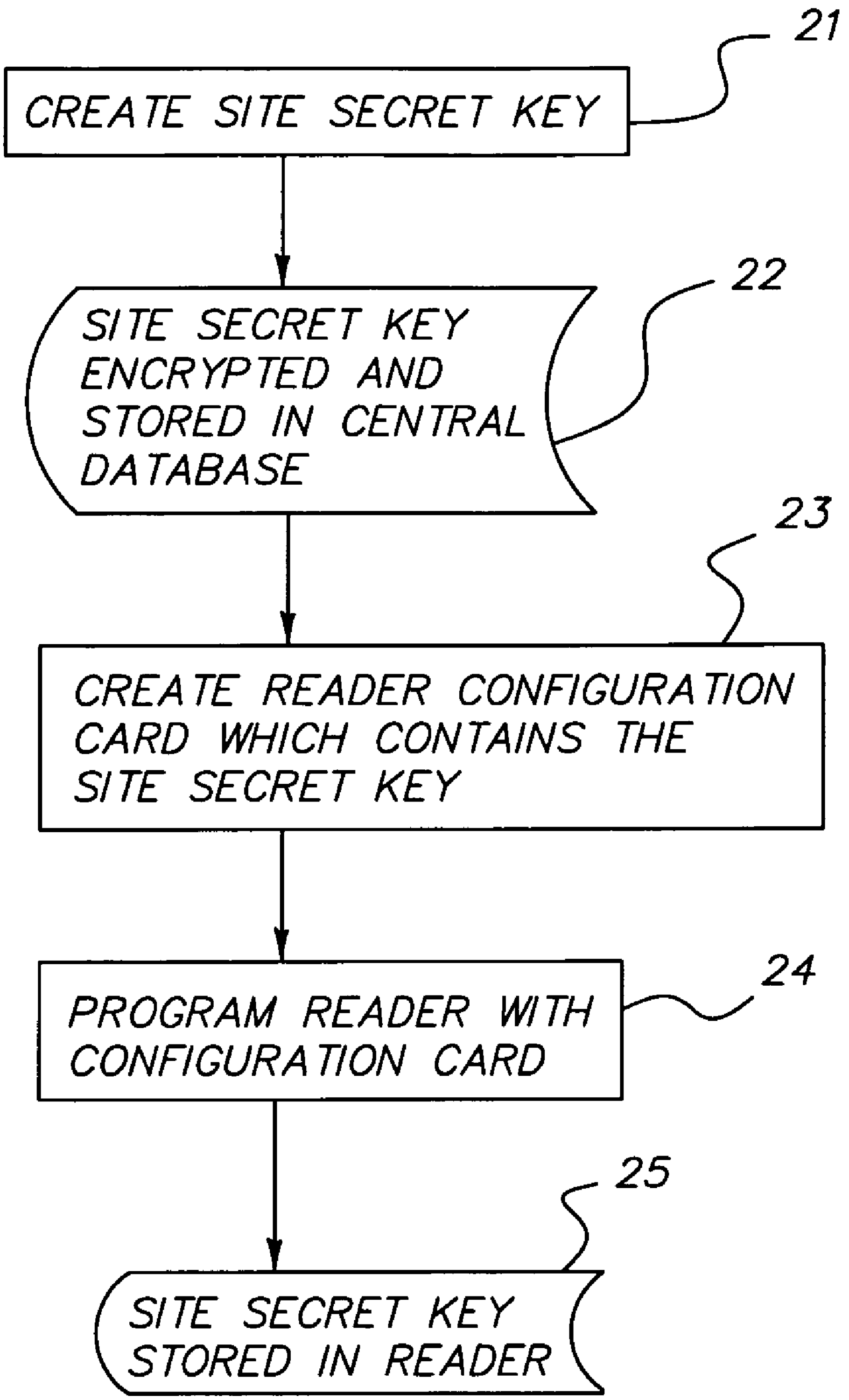
FIG. 2 is a flow chart showing the operation for programming readers of FIG. 1 with the Site Secret Key.

Both the badging workstation 12 and the readers 18 perform data encryption as will be described in FIGS. 3 and 4 in accordance with a Site Secret Key. FIG. 2 shows the process of creating and distributing the Site Secret Key to readers 18 in system 10. The Site Secret Key is created at the security server (step 20) either manually or automatically, encrypted, and stored in the central database (step 22). Such encryption may be for example by Windows CryptoAPI. In order to program each reader 18 with the Site Secret Key, a reader configuration card 17 containing the Site Secret Key is generated utilizing smart card reader/writer 17 connected to the computer server 13 (step 23). Each reader 18 is then programmed with the configuration card (step 24) by reading the smart card memory to obtain the Site Secret Key and storing the Site Secret Key in the reader's memory (step 24). Less preferably, the Site Secret Key is manually entered at the reader when placed in an operating in a programming mode, or by a portable electronic device, such as a laptop computer or PDA, having an interface which may be wirelessly or by wire coupled to a programming port on the reader. The reader is programmed by the data read from a smart card as to whether a smart card is a configuration card or a badge. The data and data structures used on smart card to distinguish the different card types to a reader is defined by the smart card's manufacturer, and the reader is programmed to read such smart cards accordingly. The badging workstation 12 is also provided with the Site Secret Key in its external database by accessing the key from the central database 14 via computer server 13.

Referring to FIG. 2, the enrollment process of a cardholder is shown. The badging workstation 12 is connected to a badge (smart card) reader and writer 19 which has an interface for receiving the smart card badge 20, and reading and writing data into memory of the card. Although one badging workstation is shown, multiple badging workstations may be present. HR personnel enter demographic data and biometric data, as defined earlier, for the cardholder at the badging workstation (step 26), such as via keyboard and/or mouse and graphical user interface on a display of the badging work station, for inputting or modifying entries of data fields for record(s) to be associated with the smart card badge and its cardholder. As stated earlier, the badging workstation may have peripheral device, if needed, for capturing pin and/or biometric information.

The badging workstation 12 generates a Credential Identifier (ID) by concatening three numbers (i) an Agency Code, (ii) a System Code, and (iii) a Credential Number (step 27). The concatening of the three numbers is based on FASC-N (Federal Agency Smart Credential Number) ID Generation, such as described in document GSC-IS 2.1 available from the Smart Card Alliance web site at www.smartcardalliance.org. The Agency Code is a number representative of the company or organization having the security system. The System Code is a unique number associated with the particular computer server 13 of the system 10. For example, multiregional security systems, such as described in U.S. Pat. No. 6,233,588, may have a number of computer servers, each having a unique System Code. The System Code is assigned by a system administration and stored in the central database 13, the badging workstation 12 is also provided with the System Code in its external database by accessing the code from the central database 14 via computer server 13. The Credential Number is a number sequentially generated by the badging workstation 12 for each cardholder. For example, the Credential Identifier may be 97000021100001, where the Agency Code is 9700, the System Code is 0021, and the Credential Number is 00001, and the next Credential Identifier when generated would be 97000021100002, and so forth.

Next, a smart card badge is inserted (or otherwise presented) to interface with the badge reader and writer 19 and the unique Smart Card Serial Number is read from the badge by the badging workstation (step 28). The badging workstation 12 creates an HMAC (Hashed Message Authentication Code) from the Credential ID and the Smart Card Serial Number using a Triple DES (Data Encryption Security) algorithm using the Site Secret Key as the encryption seed. Triple DES algorithm is a standard encryption algorithm, such as set forth in FIPS201 and is also described at the above-cited web site. The HMAC for example may be a 32-bit number, and is unique to the cardholder.

As stated earlier, transaction data stored in the external database of the badging workstation 12 is downloaded to the computer server 13. The transaction data includes data fields for the demographic and biometric data entered at step 26, as well as other data fields for entry of the generated Credential ID, stored as the Badge Number, and the HMAC, stored as the Issue Code for the badge. The storage in the Badge Number and Issue Code data fields enables the use of the invention in existing security systems and equipment (e.g., access controller(s)) thereof that utilize Badge Numbers and Issue Codes in making access decision.

When the transaction data is read and mapped by the computer server 13, the demographic information is mapped and stored by the computer server in a record of the Employee Table of the central database, and the Badge Number and Issue Code are mapped and stored by the computer server as part of a record of the Badge Table. Further, if a pin number and/or biometric data were captured by the badging station 12 for use by reader, such data is also provided in the transaction data, and read and mapped by the computer server into appropriate data fields of the same record of the Badge Table (step 31). Further, access privileges are assigned by the computer server 13 in a record of the Access Level Table for the badge based upon the demographic data of the cardholder. The demographic data and biometric data may be stored in record (s) of the external database of the badging station along with the generated Credential Identifier and HMAC as the Badge Number and Issue Code, respectively.

The Badge Number and Issue Code along with other access privilege data defining access privileges for the cardholder (and with any pin number and/or biometric data associated with card holder), are automatically downloaded into the database of the access controller 16, as described in the earlier incorporated patent (step 32). To each access controller 16 the downloaded Credential ID and HMAC appear as a Badge Number (or ID) and Issue Code, respectively. The badging workstation 12 then stores the Credential ID onto the smart card badge, via badge reader/writer 19, from which the Smart Card Serial Number was read earlier (step 33). Steps 32 and 33 may occur is parallel or in different order than shown in the figure.

With the database of each access controller 16 now updated with Badge Number and Issue Code along with other access privilege data defining access privileges for the cardholder (and with any pin number and/or biometric data associated with card holder), the smart card badge can be used at one of readers 18 to attempt access to an area protected those readers. FIG. 4 shows the operation of the system when one of readers 18 is presented with the smart card badge (step 34), and reads the Credential Identifier and Smart Card Serial Number from memory of the smart card badge (step 36). If the information is encoded on the badge, then the reader is programmed to decode the read Credential Identifier and Smart Card Serial Number. The reader then generates an HMAC based on the Triple DES algorithm using the Site Secret Key stored in its memory and the Credential Identifier and Smart Card Serial Number read from the badge (step 37). If the reader requires a pin number, a keypad is provided upon the reader for entry of such pin number. If the reader requires input of biometric information, the reader has imagers/scanners for inputting such biometric data, and the reader can process such input into a format enabling comparison of such data with that stored in the access controller's database.

The reader 18 then sends a request with the Credential Identifier and generated HMAC to the access controller which interprets them as the Badge Number and Issue Code (step 38). The request may have other data, such entered pin number and/or biometric data captured at the reader. The access controller 16 compares the incoming Badge Number and Issue Code with those stored in its database (step 39). If a match is found (step 40), the access controller 16 determine whether the badge has access permission at the reader in accordance with the access privileges data stored for the Badge Number in the database of access controller memory, and if additional authentication data is provided in the request, that such data matches (or matches within an acceptable tolerance) stored data for the cardholder in the access controller's database (step 40). If so, an access grant message is sent to the reader (step 44), otherwise an access denied message is sent to the reader (step 43). If no match is found at step 40, an access denied message is also sent to the reader (step 43). The locking mechanism controlled by the reader is unlocked to permit entry to or exit from an area of a building if an access grant message is received.

Figure 3:
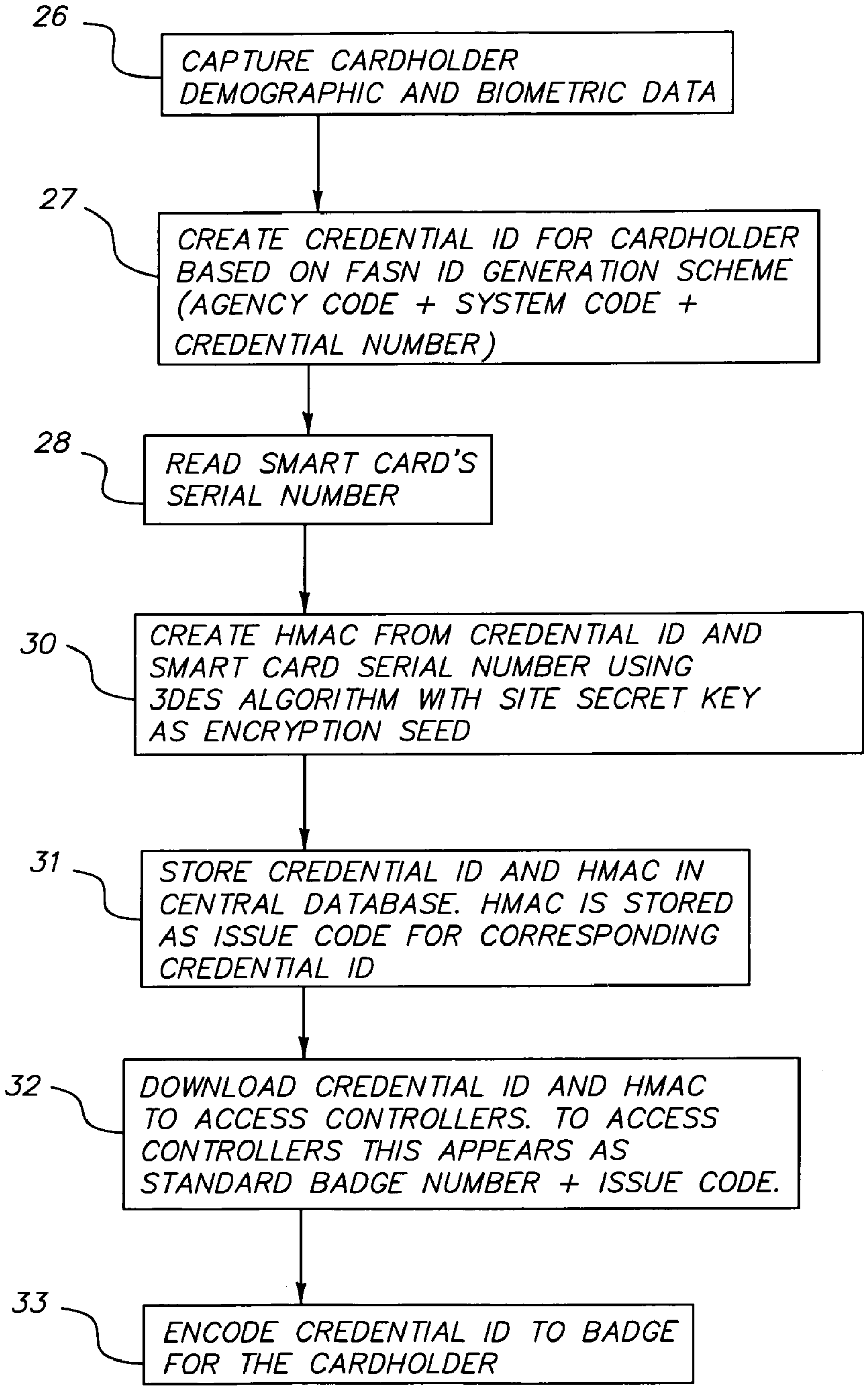
FIG. 3 is a flow chart showing the operation of enrolling a cardholder with a smart card badge in the system of FIG. 1.
Figure 4:
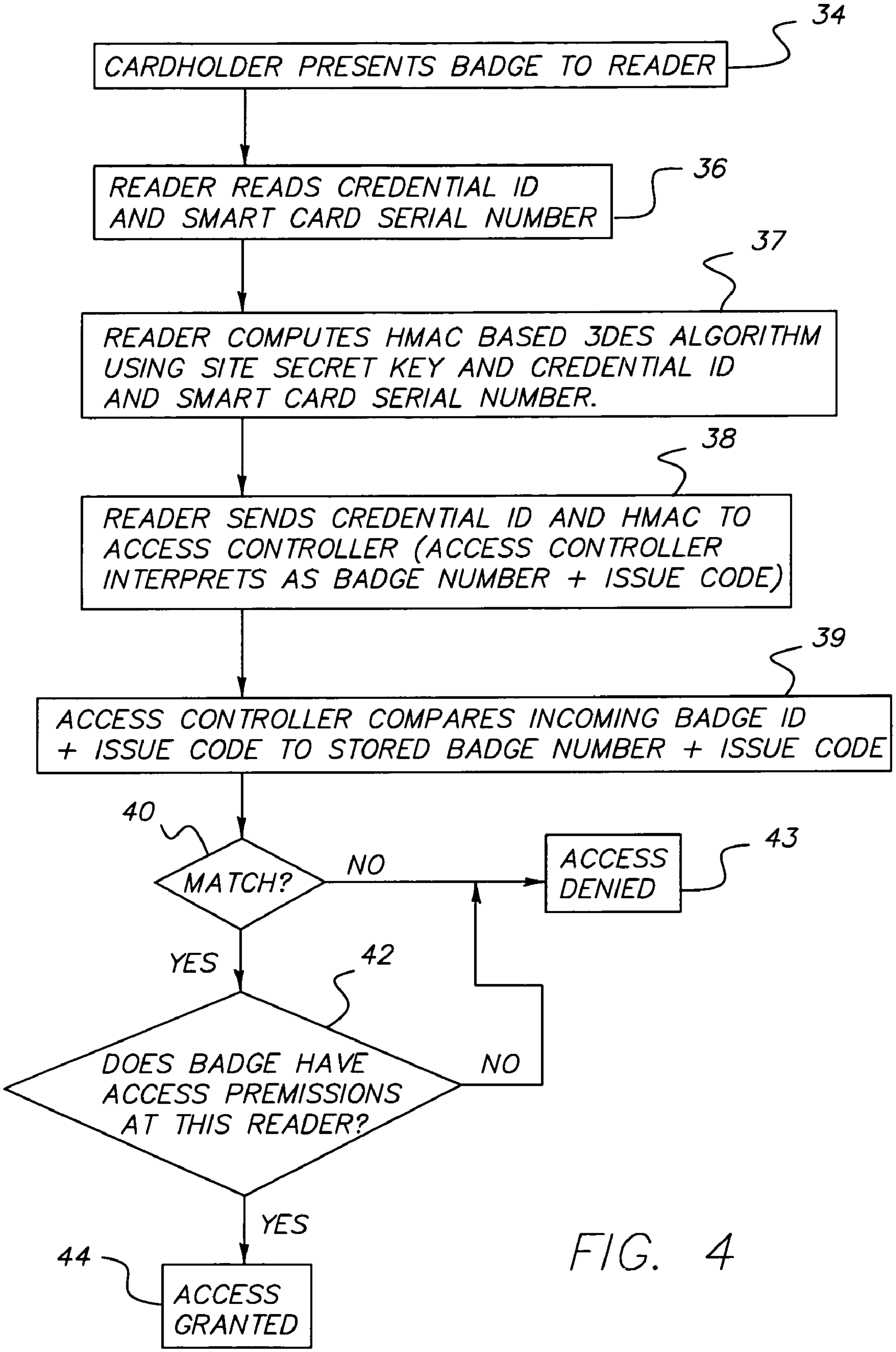
FIG. 4 is a flow chart showing the operation of the system of FIG. 1 in response to reading of a smart card badge at a reader.

Although the triple DES encryption is used, other encryption techniques may also be used at the reader at step 37, so long as the same are used at the badging station at step 20 of FIG. 3.

Further such readers are not limited to readers for use with doors of facilities, but may be readers associated with information systems, such as computer systems, or computer networks, or other information resources or environments in which user authentication is desired. An information system may be connected to a smart card badge reader, and operate similar to reader 18 to control access to such information systems in response to an access controller. This can be done at user login in which the information system waits for a signal or message from the smart card badge reader that access is granted, in addition to, or instead of a password entry for a user, and until signal or message is received access is denied.

One advantage of the invention is that the hardware and software of the central database, computer server 13, and access controllers 16 do not require modification to use the improved authentication described above, since it operates as if the Credential Identifiers and HMACs were the Badge Numbers and associated Issue Codes. Each access controller 16 operates in the same manner as described in the incorporate patent, since it compares Badge Numbers and Issue Codes in making access decisions in response to reader requests. The potential forger of a smart card badge cannot easily forge a new badge based on an existing badge, since the new badge will have a different Smart Card Serial Number, and thus will generate a different HMAC by the reader. Further, if a smart card badge is damaged or lost, the Credential Identifier of the cardholder may not change, at when the new badge is generated at the badging station it will have a new HMAC code as a result of the new Smart Card Serial Number, and such will be downloaded as the new Issue Number by the central server from the external database to the central database and access controller database. Thus, authentication in accordance with the present invention assures that the data on the smart card badge was generated from the correct source, i.e., a badging workstation of system 10, rather than an unauthorized source.

Authentication may be further enhanced by periodically changing the Site Secret Key in system 10. This can be done automatically at the computer server 13 where the badge records are modified to include a data field for the Smart Card Serial Number associated with Badge Number (i.e., Credential Identifier), and such Serial Number is transferred into this data field by the download and mapping of transaction data from the external database to the central database. The computer server 13 thus for each cardholder is programmed to automatically encrypts a new HMAC based on the Badge Number and Smart Card Serial Number stored in the central database using the new Site Secret Key, and replaces the old Issue Code for each cardholder with the new HMAC code to be associated with the Badge Number of the cardholder. A new configuration card is then used to reprogram the readers with the new Site Secret Key.

From the foregoing description, it will be apparent that there has been provided an improved security system for access control using smart card badges. Variations and modifications in the herein described system and method in accordance with the invention will undoubtedly suggest themselves to those skilled in the art. Accordingly, the foregoing description should be taken as illustrative and not in a limiting sense.

The invention claimed is:

1. A security system for access control using smart card badges each having a unique Smart Card Serial Number onto which is stored a unique Credential Identifier, in which said security system has a Site Secret Key, said system comprising:

at least one access controller having a database storing for each one of a plurality of smart card badges at least a Credential Identifier and an encrypted Authorization Code as a badge number and an issue code, respectively, for the smart card badge, and access privilege data;

one or more readers in which each of said readers when presented with one smart card badge of said plurality of smart card badges reads the Credential Identifier and Smart Card Serial Number from said one smart card badge, generates an encrypted Authorization Code based on the read Credential Identifier and Smart Card Serial Number, and a Site Secret Key stored in the reader, and sends a request to the access controller with at least the read Credential Identifier and generated Authorization Code; and said access controller receives the Credential Identifier and the Authorization Code of the request as the badge number and the issue code for said one smart card badge, respectively, and makes access decision as to whether the badge number and the issue code for said one smart card badge matches one of the badge number and issue code for one of the plurality of smart card badges stored in the database of the access controller, and whether said one smart card badge has access privileges at the reader which sent said request in accordance with said access privileges data for said one smart card badge in said database of the access controller.

2. The system according to claim 1 wherein said access controller provides a message to said reader which send the request with said access decision, and said reader grants access to area controlled by said reader in accordance with said message.

3. The system according to claim 1 further comprising a badging workstation having a smart card reader/writer for generating new ones of said smart card badges by determining a unique Credential Identifier for the new smart card badge, reading the Smart Card Serial Number from the new smart card badge, generating an encrypted Authorization Code based on the determined Credential Identifier and read Smart Card Serial Number for the new smart card badge, and the Site Secret Key, in which said determined Credential Identifier and encrypted Authorization Code are downloaded to the access controller as the badge number and issue code along with access privilege data.

4. The system according to claim 3 further comprising a computer server for enabling said download to the access controller of the Credential Identifier and encrypted Authorization Code as the badge number and issue code along with access privilege data.

5. The system according to claim 1 further comprising a configuration smart card storing said Site Secret Key, and wherein said reader when presented with the configuration card reads the Site Secret Key from the configuration card and stores the read Site Secret Key in memory of the reader.

6. The system according to claim 1 wherein at least one of said reader is coupled to an information system to enable access to said information system in accordance with at least said reader generated encrypted Authorization Code and read Credential Identifier matching a valid Authorization Code and Credential Identifier for one of said plurality of smart cards.

7. A method for access control in a system using smart card badges having at least one access controller and one or more readers coupled to said access controller, said method comprising the steps of:

storing in a database of the access controller for each of the smart card badges at least a Credential Identifier and an encrypted Authorization Code as badge number and issue code, respectively, and access privilege data for the smart card badge;

presenting one of the smart card badges to a reader;

reading at the reader the Credential Identifier and Smart Card Serial Number from the smart card badge;

generating at the reader an encrypted Authorization Code based on the read Credential Identifier and Smart Card Serial Number, and a Site Secret Key;

sending a request to the access controller with the read Credential Identifier and generated Authorization Code;

receiving at the access controller the request in which the access controller construes the Credential Identifier and the Authorization Code as a badge number and issue code, respectively;

comparing at the access controller the badge number and issue code with the badge number and issue code for the smart card badges stored in the database of the access controller; and granting access at the reader when the badge number and issue code matches that store in the database of the access controller and the smart card badge has access privileges at the reader sending the request.

8. The method according to claim 7 further comprising the steps of:

providing a badging workstation having a smart card reader/writer for generating new smart card badge;

determining at said badging station a unique Credential Identifier for the new badge;

reading the Smart Card Serial Number from the new smart card badge;

generating an encrypted Authorization Code based on the determined Credential Identifier and read Smart Card Serial Number for the new badge, and the Site Secret Key; and downloading to the access controller said determined Credential Identifier and encrypted Authorization Code as the badge number and issue code along with access privilege data.

9. The method according to claim 7 further comprising the steps of:

reading at the reader the Site Secret Key from a configuration card; and storing in said reader the read Site Secret Key.

10. A reader for smart card badges in a security system for controlling access to an area or locked door in a facility comprising:

means for reading memory from a smart card having at least a Credential Identifier and a Smart Card Serial Number;

means for generating an encrypted Authorization Code based on the read Credential Identifier and Smart Card Serial Number, and a Site Secret Key stored in said card reader;

means for sending a request to the access controller with the read Credential Identifier and generated Authorization Code;

means for receiving a response from the access controller; and means for granting access based on said response.

11. The reader according to claim 10 further comprising a keypad for entry of a pin number, and sending said pin number in said request to said access controller.

12. The reader according to claim 10 further comprising one or more biometric input means, and sending data representative of said biometric input in said request to said access controller.

13. The reader according to claim 10 wherein a configuration smart card stores said Site Secret Key, and said reader further comprises means responsive to said configuration card for reading said Site Secret Key and storing said Site Secret Key in memory of the reader for use by said generating means.

14. A badging workstation for a security system using smart card badges comprising: computer system having memory storing at least a Site Secret Key;

a smart card reader/writer coupled to said computer system for reading a Smart Card Serial Number from a smart card badge; and said computer system determines a unique Credential Identifier for the smart card badge, generates an encrypted Authorization Code based on the Credential Identifier and Smart Card Serial Number, and the Site Secret Key, and provides to another computer system said Credential Identifier and encrypted Authorization Code as the badge number and issue code for download to one or more access controller.

15. A security system for access control using smart card badges each having a unique Smart Card Serial Number onto which is stored a unique Credential Identifier, in which said security system has a Site Secret Key, said system comprising:

one or more access controllers each having a database storing for a plurality of smart card badges at least a Credential Identifier and an encrypted Authorization Code as a badge number and an issue code, respectively, for the smart card badges;

one or more readers, each of said readers when presented with one of said smart card badges reads the Credential Identifier and Smart Card Serial Number from the smart card badge, generates an encrypted Authorization Code based on the read Credential Identifier and Smart Card Serial Number, and a Site Secret Key stored in the reader, and sends a request to one of said access controllers associated with the reader for receiving said request in which said request has at least the read Credential Identifier and generated Authorization Code; and each of said access controllers in response to receiving one of said request from one of the readers operates upon the Credential Identifier and the Authorization Code of the request as a badge number and a issue code, respectively, and makes an access decision in accordance the Credential Identifier and the Authorization Code of the request matching one of the badge number and issue code, respectively, for one of the plurality of smart card badges stored in the database of the access controller, and sends a message to the reader which sent said request with said access decision.

16. The system according to claim 15 wherein at least one of said reader is coupled to an information system to enable access to said information system in accordance with at least said reader generated encrypted Authorization Code and read Credential Identifier matching a valid Authorization Code and Credential Identifier for one of said plurality of smart cards.

17. The system according to claim 15 wherein said database for each of said access controllers further stores access privileges data for said smart card badges, and each of said access controllers further in response to receiving a request further makes said access decision in accordance with said access privileges data associated with at least the badge number that matched to the badge number of one of said plurality of smart card badges in the database of the access controller.

* * * * *